June 17, 1947.  E. G. GOEHLE  2,422,404
ROTARY CUTTING TOOL
Filed Sept. 27, 1945
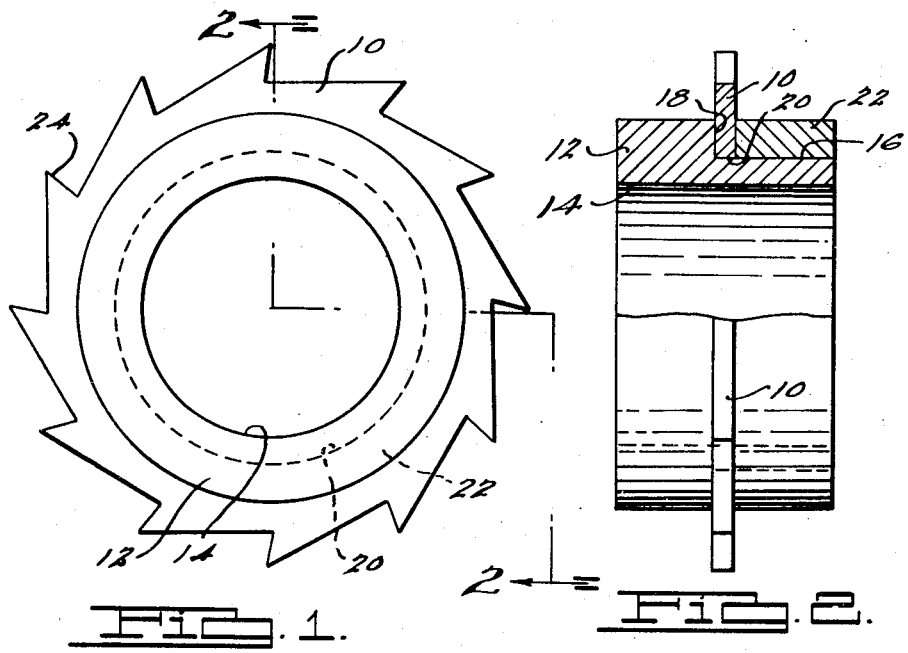
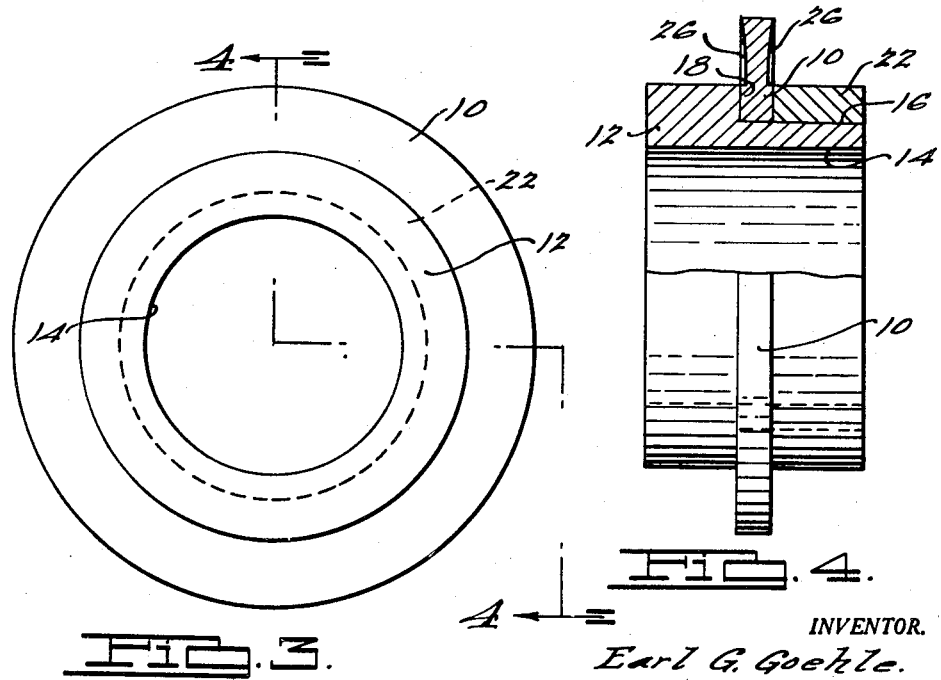
INVENTOR.
Earl G. Goehle.
BY
Harness, Dickey & Pierce.
ATTORNEYS.

Patented June 17, 1947

2,422,404

UNITED STATES PATENT OFFICE 2,422,404

ROTARY CUTTING TOOL

Earl G. Goehle, Royal Oak, Mich.

Application September 27, 1945, Serial No. 618,919

3 Claims. (Cl. 29—103)

The present invention relates to rotary cutting tools and particularly relates to improvements in commutator slitting saws.

One of the primary objects of the present invention is to provide an improved rotary cutting tool which is so constructed that it may be more easily and more accurately formed and has a longer life in use than prior tools of this type.

Another object of the invention is to provide improvements in commutator slitting saws employing a cutting element formed of cemented carbide, such as cemented tungsten carbide, in which the cutting element may be easily and more accurately formed and has a longer life in use than prior tools of this type.

Other objects of the invention will become apparent from the following specification, the drawing relating thereto and from the claims hereinafter set forth.

In the drawings in which like numerals are used to designate like parts in the several views throughout:

Figure 1 is an enlarged, side elevational view of a commutator slitting saw embodying features of the present invention;

Fig. 2 is a cross-sectional view taken substantially along the line 2—2 of Fig. 1;

Fig. 3 is a view similar to Fig. 1 illustrating a modified form of the present invention; and Fig. 4 is a cross-sectional view taken substantially along the line 4—4 of Fig. 3.

While the present invention has particular utility in the formation of commutator slitting saws, certain features thereof are also adapted for use in other types of rotary cutting tools. The invention has particular utility where the cutting tool is formed of a hard brittle material, particularly cemented carbide such as cemented tungsten carbide. Such cutting elements are difficult to manufacture due to the relative thinness and the inherent brittleness thereof. The prior art discs fracture relatively easy both while being manufactured and when in use. It is practically impossible to prevent the inclusion of foreign material between the sides of the cutting tool and the arbor to which it is mounted and the screwhead which serves to mount it to the arbor. This foreign material together with the unequal application of pressure by the screwhead, due to the lead of the screw, causes the tools to fracture and break.

According to the present invention, and referring to the drawings, in Figs. 1 and 2 one embodiment of the present invention is illustrated. A commutator slitting saw in its final form is there shown. The rotary cutting element comprises a disc-shaped element 10 of cemented tungsten carbide and in its original form the periphery thereof is circular without having the saw teeth formed therein.

A hub member 12 having a central opening 14 therethrough is provided and is formed with a portion 16 of reduced diameter which forms a radial shoulder 18. The cutting element 10 has a central opening 20 therethrough, and such cutting element is disposed over the reduced portion with one face of the element 10 abutting against the radial and annular shoulder 18. A ring member 22 is then disposed over the reduced portion 16 with the inner radial face thereof abutting against the opposite face of the cutting element 10. The members 12 and 22 are formed of such materials as cold-rolled steel, bronze or copper which are relatively softer materials than the tungsten carbide element 10 and which can readily withstand shock without fracture.

With the parts assembled in the relationship indicated, they are then brazed together, with silver solder at 2200° F., by well-known brazing methods.

The outer peripheries of members 12 and 22 terminate inwardly of the periphery of element 10, and the radial wall 18 and the adjacent radial surface of member 22 serve to support or back up the cutting element 10 a substantial distance out toward the cutting or working portions thereof.

With the element 10 so supported, the assembly may be magnetically held during the cutting of the saw teeth 24. This permits an accurate formation of the saw teeth and furthermore serves to give adequate support to the brittle element 10 so that there is less danger of fracture or breakage during formation of the teeth than in prior tools.

The saw so formed, has particular utility as a commutator saw and stands up in use. It will be appreciated that the copper in the commutator tends to crowd the saw into the mica and with prior art constructions the saws are snapped and broken. The structure of the present invention gives support to the cutting element 10 out to a position close to the cutting teeth which materially reduces this breakage.

The structure above described relates to a saw, but it also has utility as a cutting tool without the formation of the cutting teeth therein, employing the peripheral edge of the element 10 as the cutting means. In Figs. 3 and 4, a modified form is shown in which the teeth are not illustrated and in which those portions of the exposed faces of the cutting member 10 are tapered inwardly from the periphery thereof as indicated at 26. This in effect provides concave portions on the radial faces of the cutting element and serves to provide clearance as the cutting tool goes into the work. The tapered surfaces 26 may also be employed with the saw construction above described. It is possible to put this taper on the tool due to the construction of the device of the present invention because the cutting element may be properly supported, after it has been brazed to members 12 and 22, for the performance of this work on it.

It will be appreciated that while certain aspects of the present invention may be applicable to rotary cutting tools generally, the present invention has particular significance in connection with commutator cutting saws where there are peculiar problems due to the smallness of the cutting tool. For example, commutator cutting saws have dimensions where the cutting disc is approximately ½" in diameter and the thickness of the disc is about .025".

Formal changes may be made in the specific embodiments of the invention described without departing from the spirit and substance of the invention, the scope of which is commensurate with the appended claims.

What is claimed is:

1. A rotary cutting tool comprising a combination hub and supporting member, said member having an axial opening therethrough and an outer periphery coaxial therewith, said member having an annular pocket extending around and through the periphery thereof with opposed walls lying in planes transverse to the axis of said opening, and a thin flat annular shaped cutting element of cemented carbide having the inner annular portion thereof disposed within said pocket and substantially all of said inner annular portion being permanently brazed to both of said walls, said cutting element having the remaining portion thereof exposed and projecting beyond and around the periphery of the hub, the radial dimension of said exposed portion being relatively small compared to the overall diameter of the cutting tool, whereby the exposed portion of said cutting element is supported adjacent the zone of cutting.

2. A rotary cutting tool for cutting slots of uniform width throughout their depth comprising a combination hub and supporting member, said member having an axial opening therethrough and an outer periphery coaxial therewith, said member having an annular pocket extending around and through the periphery thereof with opposed walls lying in planes transverse to the axis of said opening, and a preformed thin flat annular shaped cutting element of cemented carbide provided with substantially parallel side walls and having the inner annular portion thereof disposed within said pocket and substantially all of said inner annular portion being permanently brazed to both of said walls, said cutting element having the remaining portion thereof exposed with the exposed portions of said side walls projecting beyond and around the periphery of the hub to provide a portion to cut said slots of uniform width throughout their depth, the radial dimension of said exposed portion being relatively small compared to the overall diameter of the cutting tool, whereby the exposed portion of said cutting element is supported adjacent the zone of cutting.

3. A rotary cutting tool for cutting slots of uniform width throughout their depth comprising a combination hub and supporting member, said member having an axial opening therethrough and an outer periphery coaxial therewith, said member having an annular pocket extending around and through the periphery thereof with opposed walls lying in planes transverse to the axis of said opening, and a preformed thin flat annular shaped cutting element of cemented carbide provided with substantially parallel side walls and having the inner annular portion thereof disposed within said pocket and substantially all of said inner annular portion being permanently brazed to both of said walls, said cutting element having the remaining portion thereof exposed with the exposed portions of said side walls projecting beyond and around the periphery of the hub to provide a portion to cut said slots of uniform width throughout their depth, the radial dimension of said exposed portion being relatively small compared to the overall diameter of the cutting tool, whereby the exposed portion of said cutting element is supported adjacent the zone of cutting, the exposed portions of said side walls being tapered inwardly from the periphery thereof to provide cutting relief.

EARL G. GOEHLE.

REFERENCES CITED

The following references are of record in the file of this patent:

UNITED STATES PATENTS

| Number | Name | Date |
| --- | --- | --- |
| 1,465,240 | Schurr | Aug. 14, 1923 |
| 1,974,215 | Kilmer | Sept. 18, 1934 |
| 2,054,311 | Adams | Sept. 15, 1936 |
| 1,904,568 | Taylor | Apr. 18, 1933 |